United States Patent
Essemiani et al.

(10) Patent No.: US 7,722,776 B2
(45) Date of Patent: May 25, 2010

(54) GRAVITATIONAL SEPARATION DEVICE FOR WATER TREATMENT

(75) Inventors: Karim Essemiani, Moon Township, PA (US); Olivier Iborra, Saint Vigor le Grand (FR); Michel Badard, Clamart (FR)

(73) Assignee: OTV SA, Saint Maurice Cedex (FR)

( * ) Notice: Subject to any disclaimer, the term of this patent is extended or adjusted under 35 U.S.C. 154(b) by 0 days.

(21) Appl. No.: 11/995,061

(22) PCT Filed: Jul. 24, 2006

(86) PCT No.: PCT/EP2006/064592

§ 371 (c)(1),
(2), (4) Date: Aug. 22, 2008

(87) PCT Pub. No.: WO2007/012633

PCT Pub. Date: Feb. 1, 2007

(65) Prior Publication Data

US 2009/0218300 A1 Sep. 3, 2009

(30) Foreign Application Priority Data

Jul. 25, 2005 (FR) .................................. 05 07889

(51) Int. Cl.
*B01D 21/24* (2006.01)
(52) U.S. Cl. ........................ 210/801; 210/519; 210/521; 210/528
(58) Field of Classification Search ................. 210/801, 210/519, 521, 528, 532.1, 540
See application file for complete search history.

(56) References Cited

U.S. PATENT DOCUMENTS

| | | | | |
|---|---|---|---|---|
| 2,340,226 A | * | 1/1944 | Roberts et al. | 210/528 |
| 2,775,556 A | * | 12/1956 | Kelly et al. | 210/528 |
| 2,838,180 A | * | 6/1958 | Lawlor | 210/528 |
| 2,961,099 A | | 11/1960 | Lind et al. | |
| 2,961,100 A | | 11/1960 | Katz et al. | |
| 3,017,998 A | * | 1/1962 | Conley | 210/519 |
| 3,136,724 A | | 6/1964 | Lind et al. | |
| 3,228,530 A | * | 1/1966 | Quast et al. | 210/519 |
| 3,395,800 A | * | 8/1968 | Kraus et al. | 210/519 |
| 3,717,257 A | | 2/1973 | Boyle | |
| 3,891,557 A | * | 6/1975 | Edgerton | 210/519 |
| 4,038,185 A | * | 7/1977 | Kline | 210/519 |
| 4,127,488 A | * | 11/1978 | Bell et al. | 210/519 |
| 4,390,429 A | * | 6/1983 | Lejeune et al. | 210/519 |
| 4,555,340 A | * | 11/1985 | Boyle | 210/519 |
| 5,252,205 A | * | 10/1993 | Schaller | 210/521 |
| 6,276,537 B1 | * | 8/2001 | Esler et al. | 210/519 |

* cited by examiner

*Primary Examiner*—Christopher Upton
(74) *Attorney, Agent, or Firm*—Coats & Bennett, P.L.L.C.

(57) ABSTRACT

A gravitational separation device for purifying water includes a basin for receiving and holding the water. The basin includes an internal wall. At least one supply channel is provided to the periphery of the basin for providing water to the basin. A plurality of openings is provided in a bottom or floor portion of the supply channel. Disposed under the openings is a plurality of deflector plates. A skirt spaced from the internal wall of the basin is inclined towards the interior of the basin at an angle of approximately 5° to 80°. A discharge channel is provided for discharging liquid from the basin, and there is also provided a device for discharging suspended particles.

23 Claims, 7 Drawing Sheets

GRAVITATIONAL SEPARATION DEVICE FOR WATER TREATMENT

This application is a U.S. National Stage application of PCT Application No. PCT/EP2006106/4592, with an international filing date of Jul. 24, 2006. Applicant claims priority based on French application serial no. 05 07889 filed Jul. 25, 2005.

This invention relates to the field of the design and production of plants for treating water with a view to its purification.

More specifically, the invention relates to a new device for gravitational separation of water. Such devices are known to a person skilled in the art as "clarifiers" or "settling tanks".

The successful operation of treatment plants is determined by the successful hydraulic operation of the structures constituting them. This is particularly true in particular for clarifiers, which enable the gravitational separation of solid particles present in the water to be treated.

The main features of a clarification structure are defined primarily by:

- its geometric shape, which is generally circular, square or rectangular;
- the positioning of its means of supply of water to be clarified, which is generally central or peripheral;
- its internal baffling;
- its sludge/flocculate/settled particle collection system, which is generally constituted by a scraping or suction system;
- its clarified water recovery system, which is generally positioned at the centre of the structure or at the periphery thereof.

The efficacy of these structures can be optimised by certain options such as, in particular, inclined blades provided in the structure, which make it possible to improve the settling and clarification phenomena.

Clarifiers with a circular basin are very widely used for the gravitational separation of water with a view to obtaining a purified liquid phase and an essentially solid phase constituted by suspended particles, which were initially present in the water. Such suspended particles can be constituted by solid particles, such as, for example, sand, and/or by biological floc when the clarification has been preceded by a biological water treatment step.

Thus, the U.S. Pat. No. 2,961,099 describes a circular clarifier for separating suspended particles from a liquid, having a circular wall and a base, a vertical circular skirt spaced from said base and said wall and defining an annular chamber opening in the lower portion into the basin, means for discharging the clarified liquid phase, means forming a channel for supplying water to be treated to the basin, provided at the periphery thereof and equipped with a plurality of openings in the floor of said channel, under which openings deflective plates positioned horizontally and decanted particle discharge means are provided.

In this type of clarifier, the water to be treated reaches the structure by the peripheral supply channel, passes through the openings provided therein and encounters the horizontal deflective plates. The presence of a vertical circular skirt then makes it possible to distribute the water vertically. Once it has passed said skirt, the water returns to a horizontal distribution. The skirt thus makes it possible to minimise short-circuits during which the water arriving by the supply channel leaves again through the discharge channel without having had time to settle.

The water treated in a clarifier of this type therefore has a movement that can be described as "two-dimensional" in the basin of the clarifier, i.e. an essentially horizontal, then essentially vertical movement.

Nevertheless, this type of clarifier has the disadvantage of imparting on the water passing under the skirt a horizontal movement capable of disturbing the sludge bed present at the base of the basin and constituted by the settled material not yet discharged by the discharge means provided for this purpose, and in some cases causing it to be suspended again, which is in opposition to the primary objective of such structures.

In addition, due to the "two-dimensional" movement of the water, a relatively unequal spatial distribution of the suspended material is observed in this type of structure. Such an unequal distribution leads to the need to increase the residence time of the water to be treated in such devices and/or to oversize them.

Moreover, in the case of high variations in the flow rate of water to be treated entering the structure, this type of clarifier also has the disadvantage of variable efficacy. In particular, the path covered by the water after its passage under the skirt can vary largely according to the flow rate, which can lead to more or less significant short-circuits, and, consequently, reduced efficacy of the structure.

An objective of this invention is therefore to propose a new gravitational separation device architecture, making it possible to avoid the re-suspension of settled material.

Another objective of this invention is also to minimise short-circuits of the water to be treated, i.e. the return of the water to the discharge opening upon its arrival in the basin.

Another objective of this invention is also to propose such a device allowing for equal distribution of the water to be treated, and therefore of the suspended material that it contains, in the basin.

Another objective of this invention is not to add mechanical agitation means to this type of device so as to obtain an equal distribution. Indeed, the addition of such mechanical means complicates the production of such structures and in particular increases their production and maintenance costs.

Yet another objective of this invention is to propose an improved clarifier having a lower production cost than those of the prior art. In particular, an objective of the invention is to describe such a clarifier capable of being provided with a basin with an almost flat base, while allowing for a higher speed of passage in it than the speeds allowed by the clarifiers of the prior art, and a smaller structure volume than those of the prior art, while providing the same treatment efficacy.

Another objective of this invention is to improve the distribution of the residence times of the water in the structure while minimising short-circuits and dead areas so as to improve the settling of particles contained in them.

Another objective of this invention is to improve the settling of particles present in the water, by allowing for tangential filtration thereof through the sludge bed present in the basin.

Yet another objective of this invention is to reduce the vertical kinetic energy of the water entering the structure so as to avoid the re-suspension of the settled sludge bed, specifically in a high load period.

These various objectives are achieved by the invention, which relates to a gravitational separation device for the treatment of water, making it possible to separate suspended particles from a liquid phase, which device includes a circular basin, at least one channel for supplying water to said basin provided at the periphery thereof, a plurality of openings provided in the floor of said channel, means forming deflective plates provided under said openings, means forming a skirt provided at a distance from the internal wall of said basin, means for discharging said liquid phase and means for discharging said separated particles, characterised in that said means forming a skirt are inclined toward the interior of said basin according to an angle α of between 5° and 80° with respect to the vertical.

Thus, this invention is distinguished from the prior art essentially by the feature according to which the skirt no longer has a vertical position, but is inclined with respect to the vertical.

Such an inclination of the skirt makes it possible to avoid the disturbance of the sludge bed by the water passing under it and the re-suspension of material already settled and not yet discharged by the means provided for this purpose.

Such an inclination of the skirt also makes it possible to minimise the appearance of short-circuits.

Such an inclination of the skirt also makes it possible to impart a three-dimensional movement on the flow of water inside the structure.

Said angle α of inclination of the skirt with respect to the vertical is preferably between 30° and 60°.

According to a preferred feature of the invention, said openings provided in the floor of the supply channel have a diameter of between 50 and 200 mm. Also preferably, said openings have a height (corresponding to the thickness of the floor of the supply channel) of between 150 and 600 mm.

In practice, the sizes of these openings will be chosen so that the ratio between the speed of the water in the supply channel and that of the same water in the openings provided in the floor thereof causes a sufficient head loss. It is noted that the head loss caused by the particular sizes of the openings according tot his invention may not be constant. Such particular sizes make it possible to break the horizontal flow of water in the supply channel and to move it in a direction with an essentially vertical component that makes it possible to control the direction of water flow upstream o the means forming deflective plates. This is particularly beneficial in particular when, at the level of the point of entry of the water into the supply channel, the water is directed in opposite directions (this particular case is implemented conventionally in large-scale clarifiers).

The head loss caused by these particular sizes of the openings and the fact that they enable a movement with a vertical component to be imparted on the water make it possible to obtain an equal distribution of this water, and therefore of the suspended particles that it contains in the basin.

Also preferably, said openings in the channel for supplying water to be treated are spaced apart from one another by an essentially constant distance of between 500 and 3000 mm.

Such a feature is also instrumental in obtaining a sufficient head loss for promoting equal distribution of water in the basin.

Although the openings of the channel for supplying water to be treated can conventionally have a vertical axis, at least some of these openings, preferably all, have an axis tangentially inclined by an angle β1 of less than 45° with respect to the vertical.

This feature makes it possible to cause a substantially spiral flow of water in the tub, i.e. to confer on said water a three-dimensional rotational movement thereof in the structure.

This type of flow makes it possible to increase the length of hydraulic travel of the water in the clarifier and thus increase the distribution of "active" residence times thus improving the settling. This also makes it possible to enhance the equal distribution of water to be treated in the clarifier. Finally, such a three-dimensional flow also makes it possible to promote the tangential filtration of the effluent through the sludge bed and to improve the efficacy of the thickening.

According to an alternative of the invention, at least some of said openings, preferably all, also have an axis inclined radially by an angle β2 of less than 45° with respect to the vertical.

Such a feature makes it possible to emphasize the radial component of the movement imparted on the water.

The means forming deflective plates provided under the openings will be provided at a sufficient distance from them so as not to cause an increase in head loss of the water, but small enough to reduce the vertical kinetic energy of the water passing through these openings. In practice, these plates will generally be installed at a distance of between 15 cm and 50 cm from the base of the floor of the supply channel.

According to a particularly advantageous alternative of the invention, said means forming deflective plates are organised in a "corner"-type flow guide. Such a flow guide structure, which will be described in detail below in reference to the description of embodiments, makes it possible to impart a tangential component on the speed of the water in the basin and thus to promote a rotational movement thereof.

According to another particularly advantageous alternative of the invention, said means forming deflective plates are organised in "open-box"-type flow guides.

Such a flow guide structure makes it possible to impart a tangential component on the speed of the water and to even further promote a rotational movement thereof in the basin.

Also according to an alternative, said means forming deflective plates include plates arranged opposite said openings, at least some of which plates, preferably all, preferably being inclined tangentially by an angle δ1 of between 5° and 80° with respect to the horizontal.

This inclination of the plates opposite the openings makes it possible to promote the spiral movement of the water. When the axes of the openings provided in the floor of the supply channel are also inclined as described above, this spiral movement will be even more marked.

Also according to an alternative, said means forming deflective plates include plates arranged opposite said openings, at least some of which, and preferably all of which plates, are inclined tangentially by an angle δ2 of between 5° and 80° with respect to the horizontal.

Such a feature makes it possible to further emphasize the radial component of the movement imparted on the water.

According to an alternative of the invention, said means for discharging the liquid phase form a peripheral channel provided at the periphery of said basin, which channel has an invert common with the supply channel 2, with the widths of the discharge channel and the supply channel varying inversely over the entire periphery of said basin so that the width of the floor 4 is essentially constant.

According to another alternative, said water discharge means are provided at the centre of said basin.

Said means forming a skirt according to this invention are preferably secured to the channel for supplying water to be treated and/or means for discharging the liquid phase.

The invention, as well as its various advantages, can be more easily understood in view of the following description of two non-limiting embodiments provided in reference to the drawings, in which:

FIG. 1 shows a diagrammatic cross-section view of an embodiment of a gravitational separation device for treating water according to the invention.

This device is intended to clarify water containing suspended particles, and makes it possible to separate these particles from a clarified liquid phase.

Figure 1:
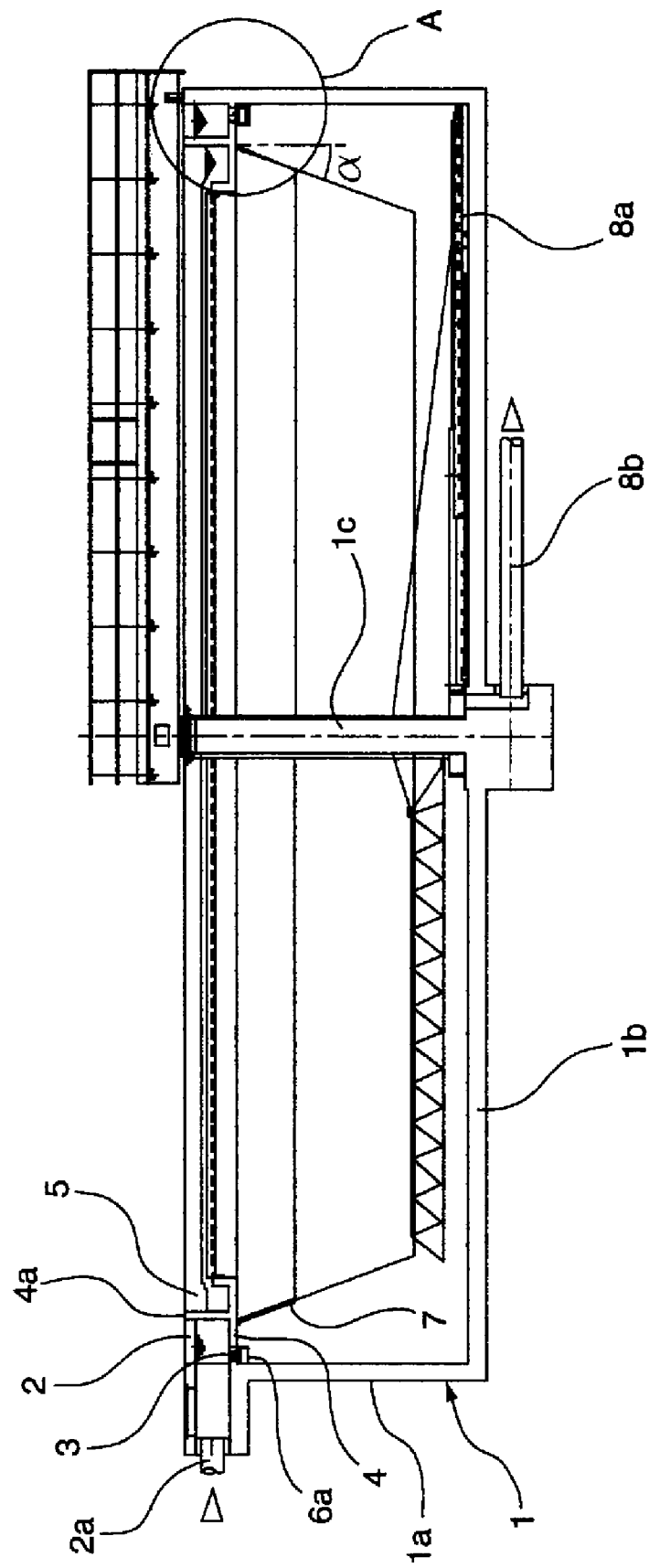
FIG. 1 shows a diagrammatic cross-section view of a clarification device according to this invention.
Figure 2:
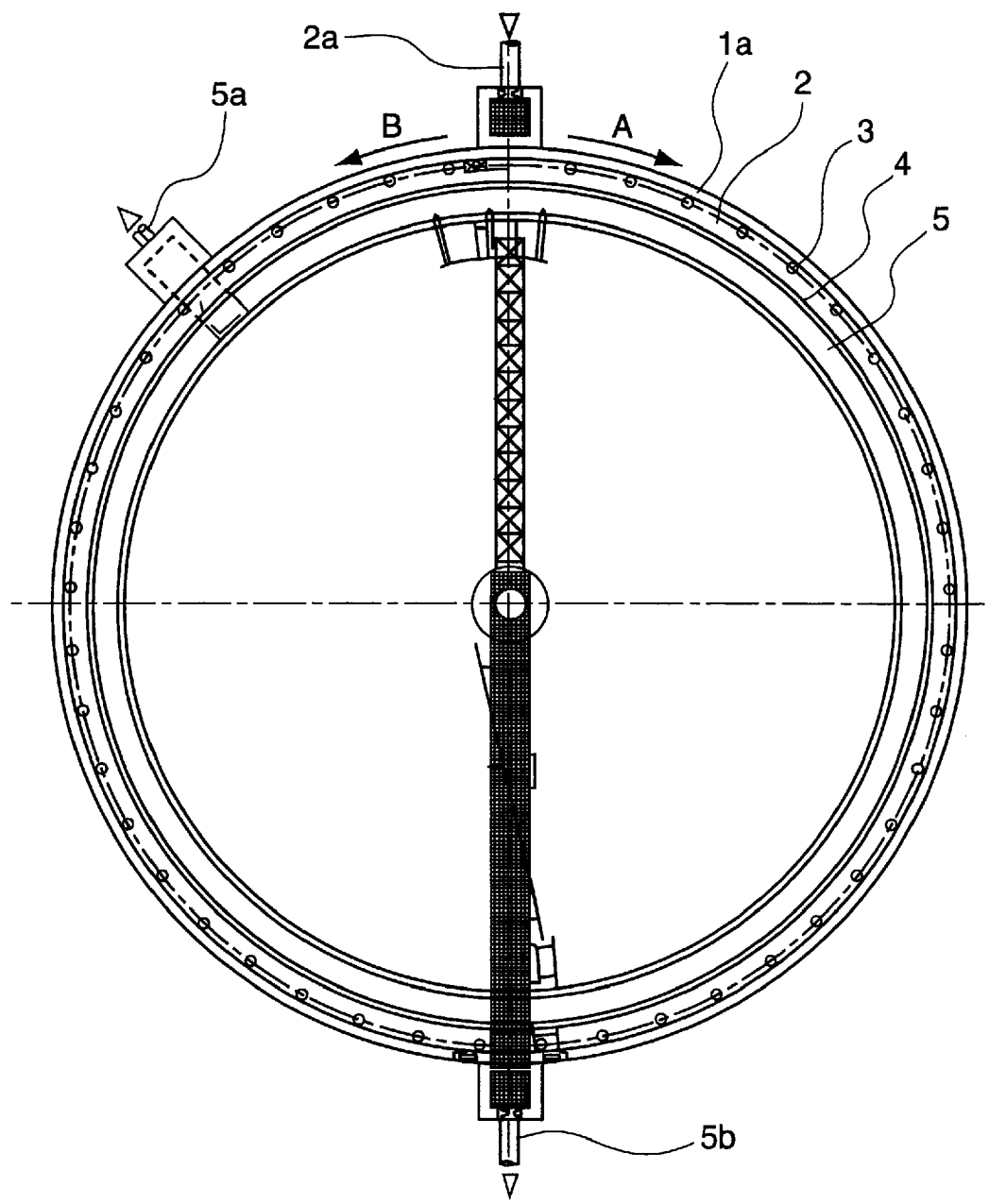
FIG. 2 shows a diagrammatic top view of the device according to FIG. 1.

In reference to FIGS. 1 and 2, this device includes a large circular basin 1 (with a diameter of more than 30 meters) having a lateral wall 1a and an essentially flat base 1b.

In the upper portion of this basin 1, and at the periphery thereof, a supply channel 2 is provided for supplying water to be clarified to the basin 1 and equipped with a floor 4. The water to be clarified arrives in the supply channel by a pipeline 2a and is distributed therein in the two opposite directions represented by arrows A and B.

The supply channel 2 is provided with a plurality of openings 3 spaced apart from one another by a constant distance of 1 m and having vertical axes at 15 cm from the lateral wall 1a. These openings 3 pass through the floor 4. These openings have a height of 200 mm and a diameter of 75 mm.

These sizes enable the water to be treated, arriving by the supply channel 2, to undergo a sufficient head loss when it penetrates the interior of the basin 1.

The device also includes means for discharging clarified water including a channel 5 provided in the upper portion of the basin at the periphery thereof and sharing the same floor (invert) 4 as the channel 2 for supplying water to be treated, from which it is separated by an essentially vertical wall 4a. The clarified water is then discharged by a pipeline 5a. The cannel 2 is also provided with an outlet 5b serving to collect the floating material (foam and froth).

As can be seen in FIG. 2, the widths of the discharge channel 5 and the supply channel 2 vary inversely over the entire periphery of the basin 1 so that the width of the floor 4 is essentially constant.

The device also includes deflective plates organised in flow guides provided under each of the openings 3, and which will be described in greater detail below.

According to this invention, the device shown also includes a skirt 7 provided at a distance from the internal wall 1a of the basin 1, made of stainless steel.

According to this embodiment, this skirt 7 is inclined by an angle α of around 30° with respect to the vertical.

Finally, conventionally, the device shown includes means for discharging the separated particles that settle at the base of the basin 1. These means include a collecting tube 8a mounted so as to rotate about a central pillar 1c at the base of the basin and a channel 8b for discharging sludge collected by this collecting tube toward a pumping tank (not shown).

Figure 3:
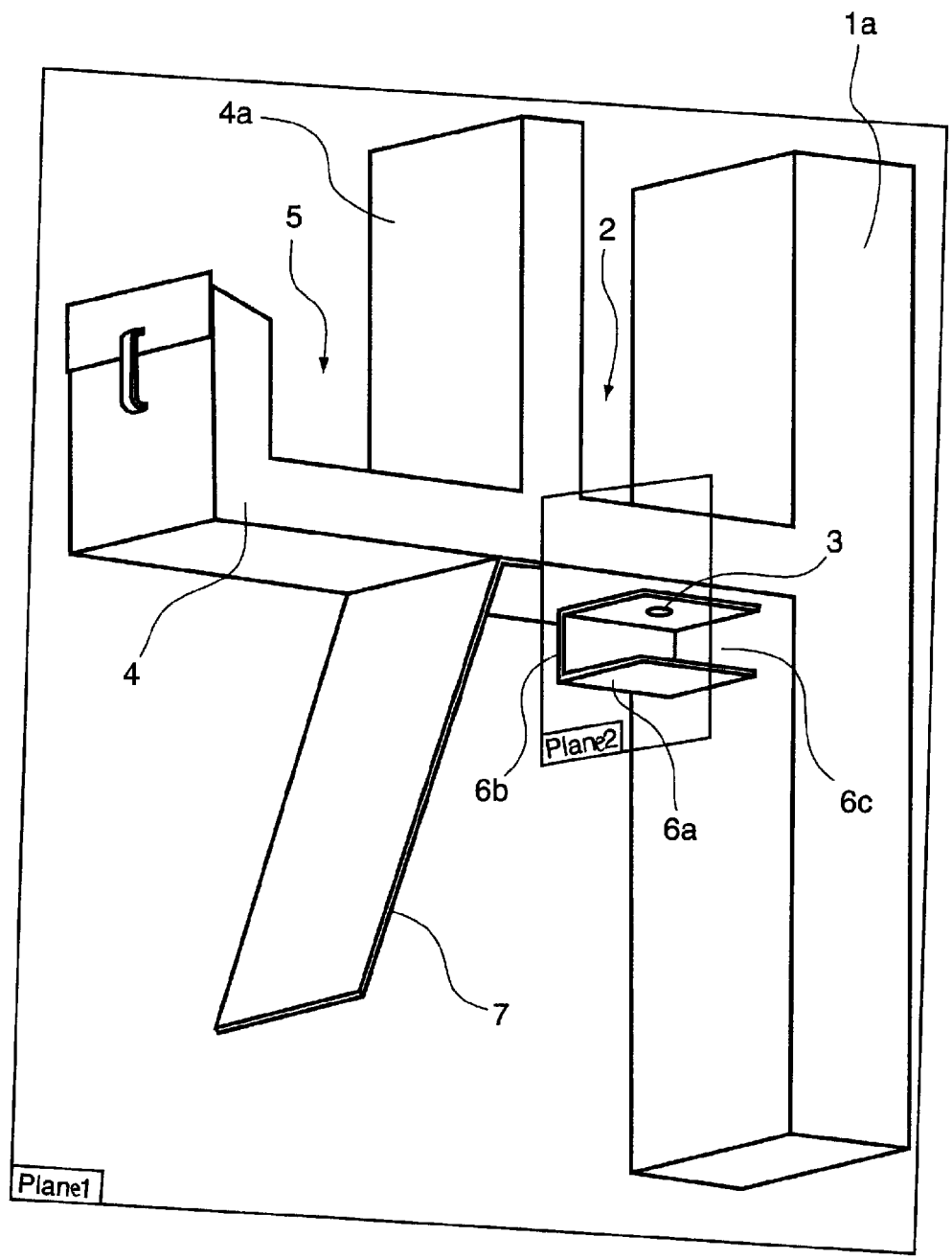
FIG. 3 shows a diagrammatic three-dimensional cross-section view of a peripheral portion of the device, appearing in the circle referenced A in FIG. 1.

In reference to FIG. 3, a flow guide is provided under each opening 3. Each flow guide has a "corner" shape and is constituted by a plate 6a opposite a corresponding opening 3, a wall 6c constituted by a portion of the lateral wall 1a and another plate 6b perpendicular to the plate 6a and the wall 6c. It is noted that in other embodiments, the wall 6c may be replaced by a plate.

Figure 4:
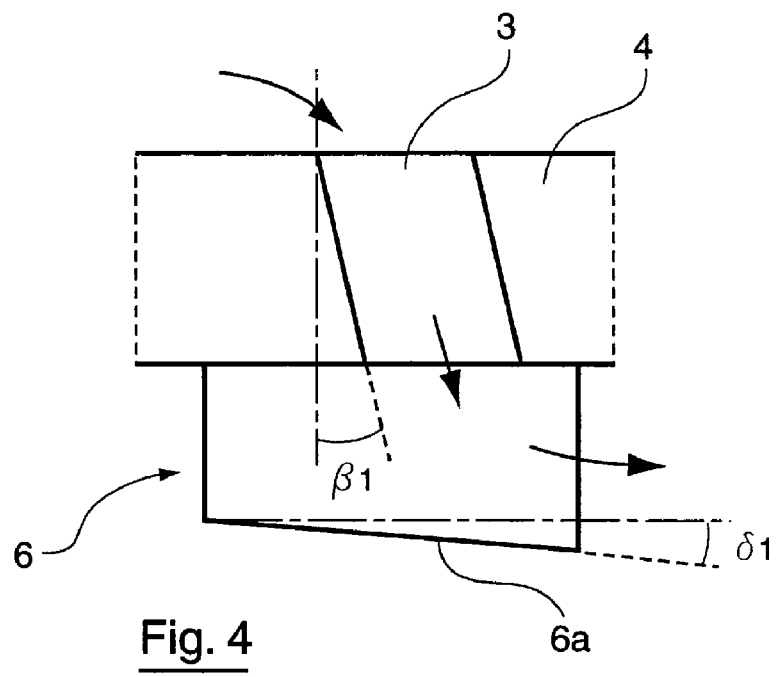
FIG. 4 shows a diagrammatic cross-section view according to plane 2 of FIG. 3.

In reference to FIG. 4, each opening has an axis inclined tangentially by an angle β1 with respect to the vertical. In this embodiment, this angle β1 is around 10°, but, depending on the embodiment, it may be up to 45°.

Also in reference to FIG. 4, each plate 6a is also inclined tangentially by an angle δ1 with respect to the horizontal. In this embodiment, this angle δ1 is 5°, but it may be up to 80° in other embodiments.

Figure 5:
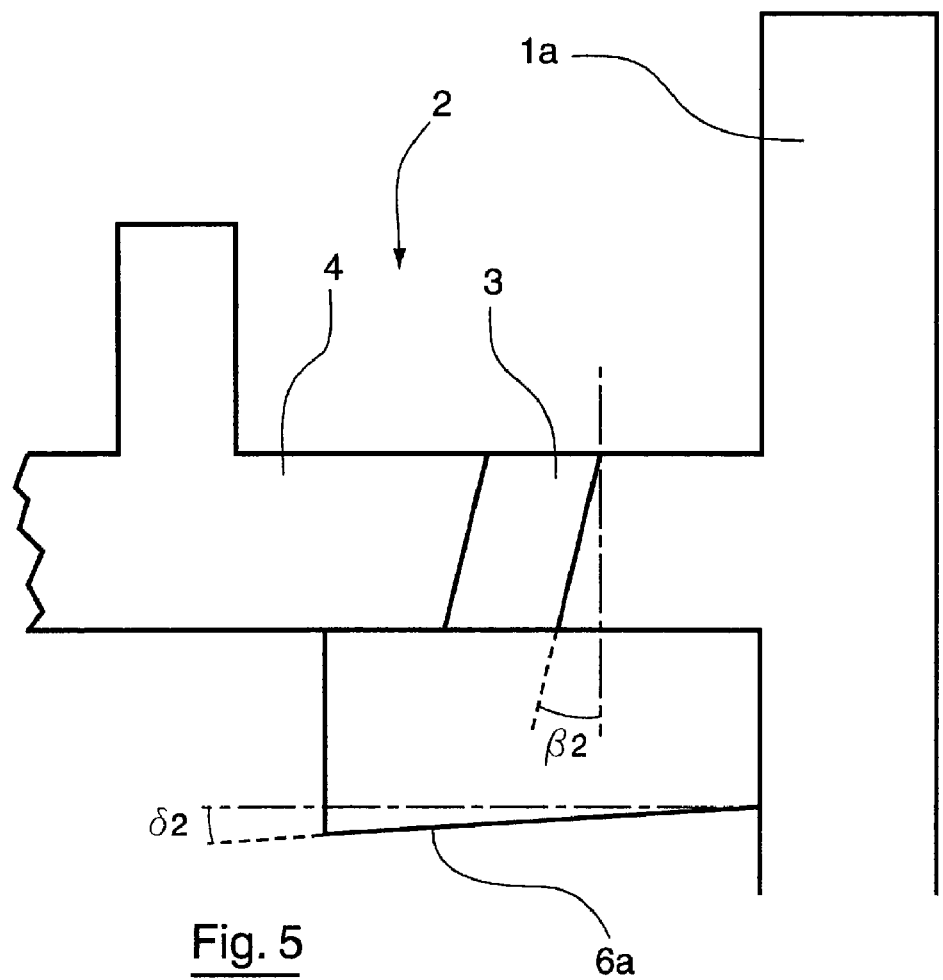
FIG. 5 shows a diagrammatic cross-section view according to the radial plane 1 of FIG. 3.

In reference to FIG. 5, the axis of each opening is also inclined radially by an angle β2 with respect to the vertical. In this embodiment, this angle β2 is around 10°, but, depending on the embodiment, it may be up to 45°.

Also in reference to FIG. 5, each plate 6a is also inclined radially by an angle δ2 with respect to the horizontal. In this embodiment, this angle β2 is 5°, but it may be up to 80° in other embodiments.

The inclination of the skirt 7 makes it possible to avoid the disturbance of the sludge bed constituted by the settled material at the base of the basin and that has not yet been suctioned by the rotating tube 8a.

This inclination also makes it possible to promote the equal distribution of water in the basin, and therefore the equal distribution of the particles to settle that it contains.

This inclination also makes it possible to minimise short-circuits, i.e. the return of water to the discharge channel 5 before it has had time to be clarified.

The inclination, both tangential and radial, of the openings 3, as well as the tangential and radial inclination of the plates 6a of the flow guides, makes it possible to impart a spiral rotational movement on the water arriving in the basin. Such a three-dimensional movement makes it possible to increase the path traveled by the water in the basin and thus increase the efficacy of the treatment of the clarifier. This architecture also makes it possible to promote the equal distribution of water in the basin.

Figure 6:
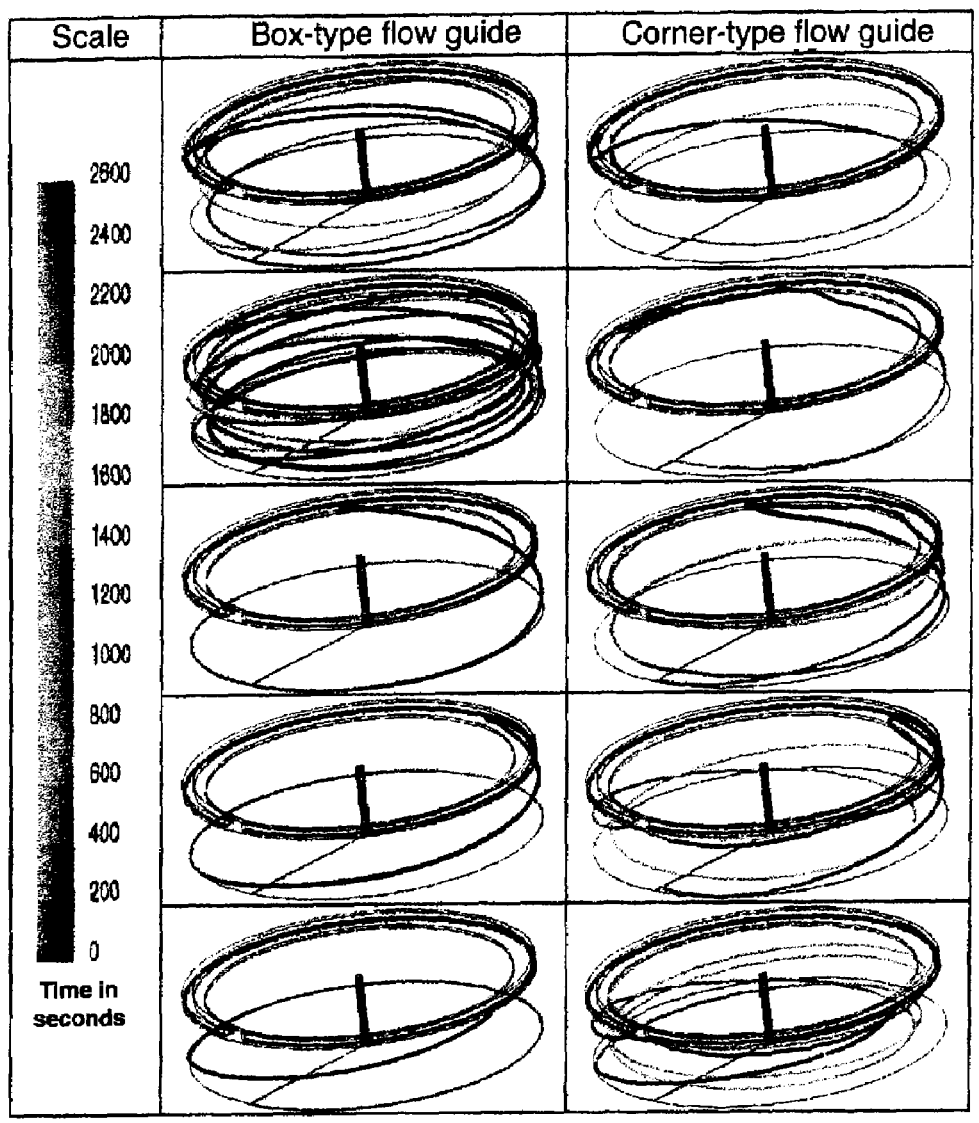
FIG. 6 shows the results of tests performed with the two embodiments of the invention described in reference to FIGS. 1 to 6.

To demonstrate the three-dimensional rotational movement of the water achieved by the invention, the two embodiments described above were implemented with water containing traceable particles. Their path in the basin 1 was monitored over time. Five trials were then conducted for each embodiment. The results are provided in FIG. 6.

According to this figure, it is noted that the particles clearly have a three-dimensional movement in the basin with a strong tangential component, due to the structure of the flow guides and the inclination of the openings, but also with a radial component, also due to the inclination of the skirt 7 enabling the particles to occupy most of the volume of the basin.

Figure 7:
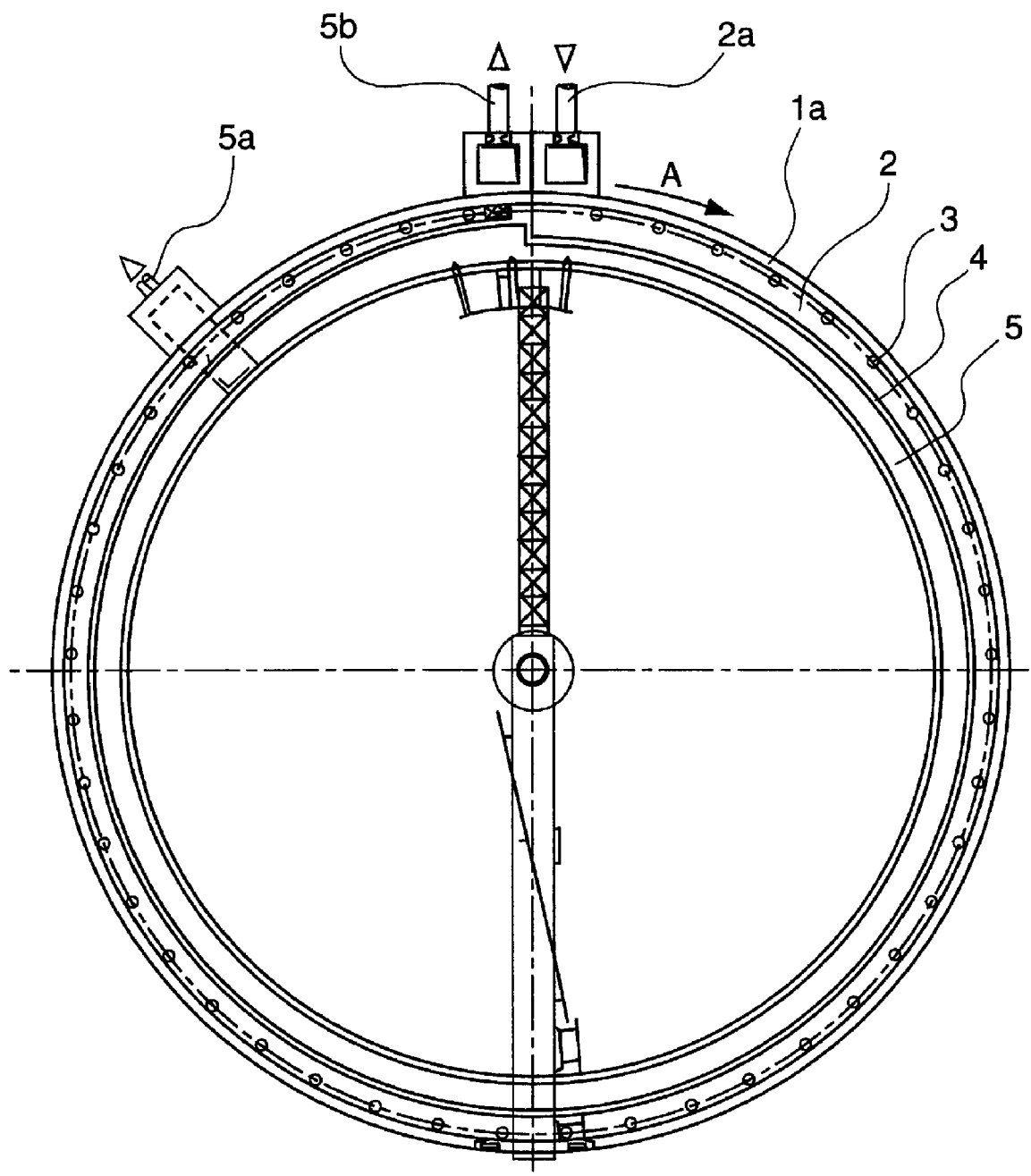
FIG. 7 shows a diagrammatic top view of a second embodiment of the invention of a device according to this invention.

In a second embodiment of the invention shown in FIG. 7, in which the numeric references show elements that are identical or similar to those appearing in FIG. 2, the device shown has a diameter (for example 25 meters) that is smaller than that according to the first embodiment. In this embodiment, the water is distributed in the supply channel in a single direction, represented by arrow A.

Figure 8:
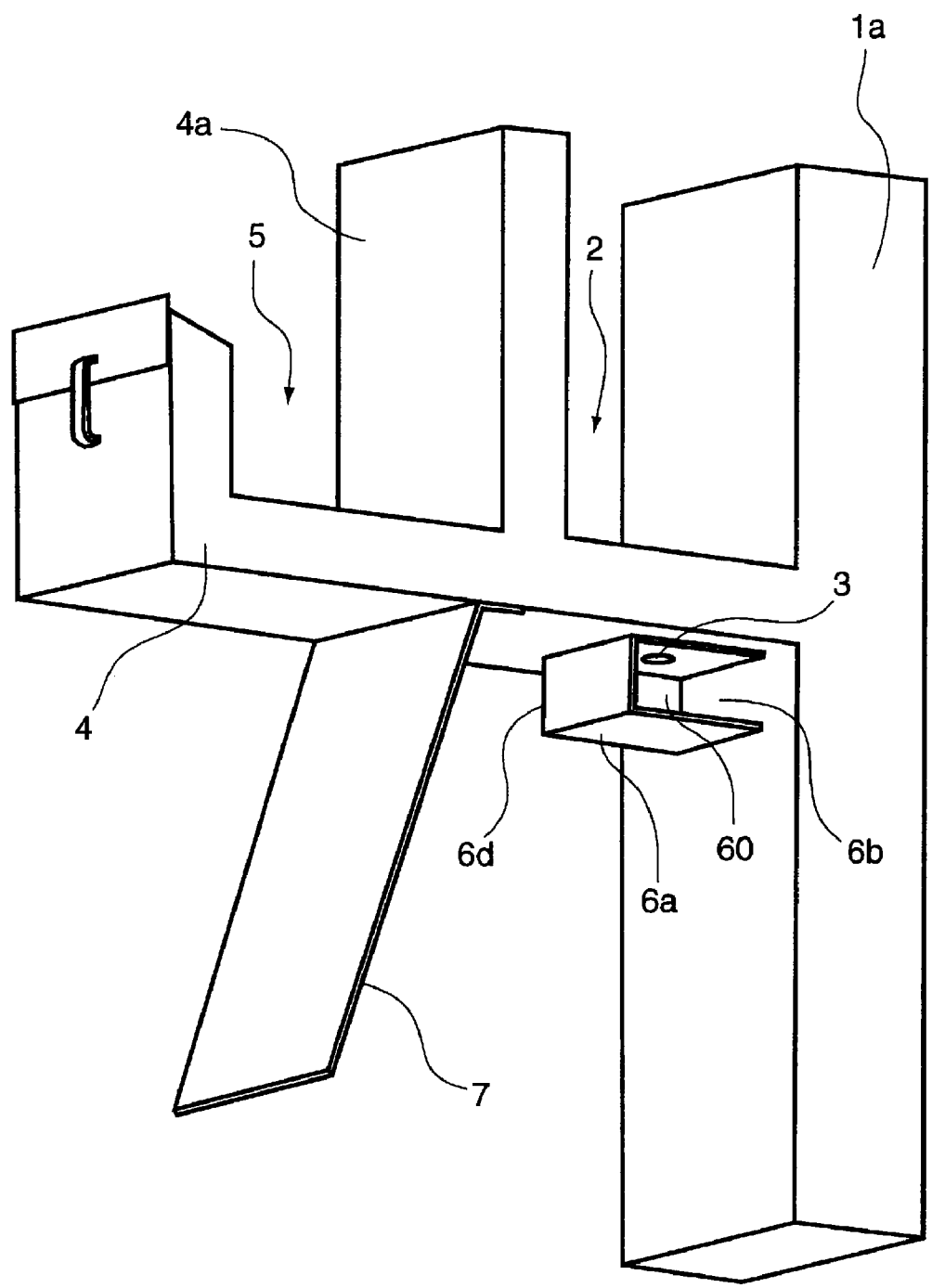
FIG. 8 shows a diagrammatic three-dimensional cross-section view of a portion of the second embodiment of this invention.

In this embodiment, the flow guides used are of the "open-box" type as shown in FIG. 8. According to this embodiment, an additional plate 6d is provided parallel to the wall portion 6b. With such flow guides, the movement of the water arriving in the basin has a stronger tangential component than in the first embodiment described above.

The embodiments of the invention described here are not intended to reduce the scope of the invention defined by the claims.

The invention claimed is:

1. A gravitational separation device for purifying water by removing suspended particles from a liquid phase, the system comprising:
    a basin for treating water having a curved wall including an inner portion and an outer portion;
    a supply channel having a constant width for supplying water to the basin disposed along a periphery of the inner portion of the wall;
    a plurality of openings provided in a floor of the supply channel;
    a skirt spaced from the inner portion of the wall adjacent to the floor, wherein the skirt is inclined inwardly toward the interior of the basin at an angle α of between approximately 5° and approximately 80°;
    a plurality of deflector plates disposed under the openings and between the inner portion of the wall and the skirt;
    a discharge channel having generally constant width for discharging the liquid phase out of the basin disposed adjacent to the supply channel; and
    a device for discharging suspended particles.

2. The device according to claim 1, wherein the angle α is between approximately 30° and approximately 60°.

3. The device according to claim 1, wherein the openings have a diameter of between approximately 50 and approximately 200 mm.

4. The device according to claim 1, wherein the openings have a height of between approximately 150 and approximately 600 mm.

5. The device according to claim 1, wherein the openings in the supply channel are spaced apart from one another by a generally constant distance of between approximately 500 and approximately 3000 mm.

6. The device according to claim 1, wherein at least one of the openings has an axis tangentially inclined by an angle β1 of less than approximately 45°.

7. The device according to claim 1, wherein at least one of the openings has an axis radially inclined by an angle β2 of less than approximately 45°.

8. The device according to claim 1, wherein the deflector plates are arranged in a corner configuration.

9. The device according to claim 1, wherein the deflector plates are arranged in an open-box configuration.

10. The device according to claim 1, wherein at least one of the deflector plates is inclined at an angle δ1 of between approximately 5° and approximately 80° with respect to an axis perpendicular to the wall of the basin.

11. The device according to claim 1, wherein at least one of the deflector plates is inclined at an angle δ2 of between approximately 5° and approximately 80° with respect to an axis perpendicular to the wall of the basin.

12. The device according to claim 1, wherein the discharge channel is disposed shares a floor common with the supply channel.

13. The device according to claim 1, wherein the skirt is secured to the supply channel or the discharge channel.

14. A method of purifying water in a gravitational separation device by removing suspended solids from a liquid phase comprising:
    a. supplying water to a basin through a supply channel with a generally constant width disposed along the inner periphery of the basin having a plurality of openings in a floor of the supply channel;
    b. directing water through the openings in the floor of the supply channel into a flow guide formed by one or more deflector plates;
    c. gravitationally settling suspended solids to the bottom of the basin;
    d. directing water underneath an inclined skirt adjacent to the floor and having an inward angle α of between approximately 5° and approximately 80° to avoid resuspension of suspended solids already settled and not yet discharged;
    e. collecting the suspended solids at the bottom of the basin
    f. discharging treated water through a discharge channel having a generally constant width disposed adjacent to the supply channel; and
    g. directing suspended solids through a discharge device.

15. The method of claim 14 including directing water underneath the inclined skirt having an angle α is between approximately 30° and approximately 60°.

16. The method of claim 14 wherein the openings in the floor of the supply channel are inclined at an angle β1 of less than approximately 45° with respect to an axis parallel with the wall.

17. The method of claim 14 wherein the openings in the floor of the supply channel are inclined at an angle β2 of less than approximately 45° with respect to an axis parallel with the wall.

18. The method of claim 14 including deflecting the water with the one or more deflector plates after the water passes through the openings in the supply floor, causing the direction of the water to change.

19. The method of claim 14 including deflecting the water with one or more deflector plates after the water passes through the openings in the supply floor, wherein at least one deflector plate is tangentially inclined by an angle δ1 of between approximately 5° and approximately 80°.

20. The method of claim 14 wherein the one or more deflector plates engage the water falling from the openings and cause the water to generally spiral around the basin.

21. A gravitational separation system for purifying water by removing suspended particles from a liquid phase, the system comprising:
    a basin for treating water including a bottom and enclosed by a curved wall;
    a supply channel having a constant width adjacent to the wall including a plurality of openings in a floor, wherein water is directed into the supply channel and through the openings downwardly into the basin;
    a plurality of deflectors disposed inwardly of the wall and adjacent to the floor, said deflectors being aligned with the openings for engaging and deflecting the water directed through the plurality of openings generally downward into the basin such that suspended solids will gravitationally settle at the bottom of the basin;
    an inclined skirt disposed inwardly of the deflectors and projecting generally downwardly and inwardly from a position adjacent to the floor so as to define a space between the skirt and the wall and wherein the skirt directs the water deflected by the deflectors downwardly and inwardly into the basin where the water moves inwardly past a lower terminal of the skirt to avoid resuspension of suspended solids already settled and not yet discharged;
    a generally annular discharge channel having a constant width disposed interiorly and adjacent to the supply channel such that the discharge channel and supply channel lie adjacently and concentrically within the wall of the basin; and a discharge device disposed adjacent to the bottom of the basin for directing the suspended solids out of the basin.

22. The gravitational separation system of claim 21 wherein the plurality of deflectors includes two vertical plates and upper and lower horizontal plates, the upper horizontal plate having an aperture aligned with at least one opening in the floor of the supply channel such that the water discharged through the aperture engages the bottom plate and is deflected generally downward into the basin.

23. The gravitational separation system of claim 21 wherein the plurality of deflectors includes upper and lower horizontal plates and a vertical plate secured there between, said deflectors are disposed adjacent to the wall of the basin with the upper horizontal plate having an aperture aligned with at least one opening in the floor of the supply channel such that the water discharged through the aperture engages the bottom plate and is deflected generally downward into the basin.

* * * * *